United States Patent [19]

Mehrgardt et al.

[11] Patent Number: 5,150,201
[45] Date of Patent: Sep. 22, 1992

[54] DIGITAL TELEVISION-SIGNAL-PROCESSING CIRCUIT WITH ORTHOGONAL OUTPUT CLOCK

[75] Inventors: Soenke Mehrgardt, March; Hans-Juergen Desor, Gundelfingen, both of Fed. Rep. of Germany

[73] Assignee: Deutsche ITT Industries GmbH, Freiburg, Fed. Rep. of Germany

[21] Appl. No.: 677,063

[22] Filed: Mar. 29, 1991

[30] Foreign Application Priority Data

Apr. 6, 1990 [DE] Fed. Rep. of Germany ....... 4011241

[51] Int. Cl.$^5$ ............ H04N 5/04; H04N 9/89; H04N 5/95
[52] U.S. Cl. ..................... 358/23; 358/17; 358/149; 358/320; 358/337; 358/13
[58] Field of Search ............. 358/13, 17, 19, 149, 358/160, 320, 337, 13

[56] References Cited

U.S. PATENT DOCUMENTS 4,646,151  2/1987  Wells, II et al. ............ 358/148
4,870,661  9/1989  Yamada et al. ............ 358/13

FOREIGN PATENT DOCUMENTS 0238232  9/1987  European Pat. Off. .
2909155  9/1979  Fed. Rep. of Germany .
3414960  4/1984  Fed. Rep. of Germany .
3041898  4/1989  Fed. Rep. of Germany .

Primary Examiner—James J. Groody
Assistant Examiner—Minsun Oh
Attorney, Agent, or Firm—Thomas L. Peterson

[57] ABSTRACT

A digital television-signal-processing circuit for a composite color signal is sampled with a first clock signal. The digitized composite color signal is reconverted with a line-locked second clock signal. The two clock signals have the same frequency. A second phase-locked loop for controlling the phase of the horizontal pulse includes a locked oscillator and is loosely coupled to a first phase-locked loop which generates a horizontal reference clock. The decoupling of the data, which is referred to the two clock signals, takes place in a dual-port read/write memory which is written into synchronously with the first clock signal and read from synchronously with the second clock signal.

12 Claims, 2 Drawing Sheets

DIGITAL TELEVISION-SIGNAL-PROCESSING CIRCUIT WITH ORTHOGONAL OUTPUT CLOCK

BACKGROUND OF THE INVENTION

1. Field of the Invention

The present invention is in the field of digital television-signal-processing circuits, and, more particularly, is directed to the generation of sampling clocks for such circuits.

2. Description of the Related

In digital television-signal-processing circuits, there are basically three different possibilities of implementing the sampling system:

a) In a line-locked system, the sampled pixels of all picture lines, referred to the screen, are arranged one below the other along exactly vertical lines.

b) In a color-carrier-locked system, such as the system locked to four times the color-subcarrier frequency, the sampled pixels are generally located one below the other only approximately. As is well known, this is a consequence of the nonintegral interleaving relationship between color-subcarrier frequency and horizontal frequency and the 25-Hz frequency offset in the PAL color-television standard.

c) A further possible sampling system is constituted by the asynchronous clock, which is locked neither to the line nor to the color carrier.

Digitization and reconversion are commonly effected at the same clock rate, but under certain circumstances, e.g., in various flicker-reduction techniques, also at clock rates differing by a factor of 2 or 4.

Image enhancement techniques (e.g., techniques involving multi-dimensional filter algorithms) require that the video signals to be processed are sampled orthogonally. This means that the sample values of different lines or pictures, referred to the screen, must be arranged one below the other along exactly vertical lines. In system a), this requirement is satisfied by the sampling. In systems b) and c), an interpolation of the video signals must be performed which corrects the data for an orthogonal sampling pattern. This is done with a skew filter. The parameter of the data interpolation is the phase difference between an imaginary line-locked sampling clock and the actual sampling clock. The phase difference is determined digitally in a first phase-locked loop and delivered as a skew value.

If digitization and reconversion are effected at the same sampling rate, the orthogonal structure of the video data must be reversed after the filtering by mathematically restoring the data to their original phase position by a reciprocal skew operation.

In both analog and digital television-signal-processing circuits, horizontal synchronization is accomplished with two phase-locked loops (PLL 1 and PLL 2). The first phase-locked loop PLL 1 generates a horizontal reference clock hr which has exactly the same line frequency as the composite color signal to be processed, but not the phase jitter of this signal. During video recorder operation, phase variations of up to $2 \times 10^{-6}$ sec may occur. The function of the second phase-locked loop PLL 2 is to maintain the exact position of the luminous spot on the tube, regardless of, for example, changes in component characteristics, line voltage, or temperature. The horizontal output stage is designed as a resonant circuit which responds to interference with hunting.

The commonly used methods to compensate for phase errors of the composite color signal via a phase shifter in the second phase-locked loop PLL 2 have the disadvantage that this control generates a spurious signal there and may cause hunting or overshoot.

This poses the problem that, on the one hand, phase changes of the video-signal source, particularly in the video recorder, must be transferred as quickly as possible to the deflection circuitry in order to adapt the horizontal output stage to the new phase. This requires a close coupling of the two phase-locked loops PLL 1 and PLL 2. On the other hand, noise components of the video-signal source are to be suppressed as far as possible, which would be supported by a loose coupling of the horizontal output stage to the instantaneous phase of the sync pulse.

SUMMARY OF THE INVENTION

It is, therefore, the object of the present invention to provide as perfect an isolation between the video-signal source and the picture reproduction as possible, with the reproduction clock being line-locked independently of the digitization clock.

The fundamental idea of the invention is to compensate for the entire phase error of the applied composite color signal by interpolation and a variable signal delay. The high-frequency phase errors of the horizontal output stage, which cause jitter and are due, for example, to dips in the horizontal deflection voltage as a result of high image contrast, are corrected on the signal side, not on the deflection side. The correction is effected by an additional variable delay of the video signals. This represents a compensation, since the delay is controlled by the flyback signal. There is no control loop for this signal delay.

The low-frequency phase errors of the horizontal output stage, which may be due to temperature effects, are corrected by the phase control of the horizontal output stage phase-locked loop PLL 2, which is to operate as an autonomous system and is to be as independent and frequency-stable as possible. The influence from the source is to be slow, which signifies loose coupling. The decoupling and delay of the data, which is referred to the digitization and reproduction clocks, is effected in a dual-port read/write memory which is written into synchronously with the digitization clock and read from synchronously with the reproduction clock.

BRIEF DESCRIPTION OF THE DRAWINGS

The invention will now be explained in greater detail with reference to the accompanying drawings, in which.

DETAILED DESCRIPTION OF THE PREFERRED EMBODIMENT

Figure 1:
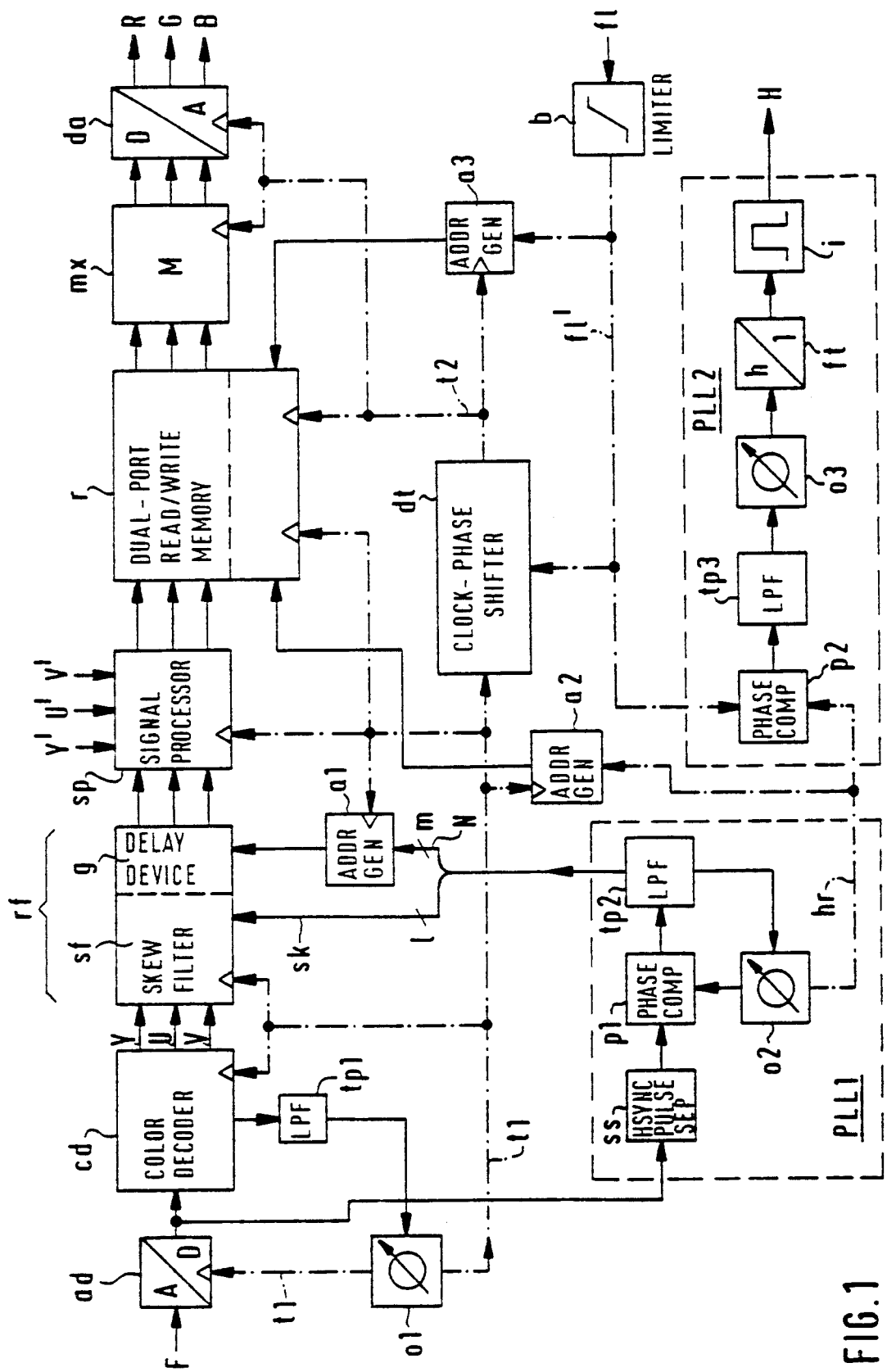
FIG. 1 illustrates a block diagram of a digital television-signal-processing circuit in accordance with the invention.

In FIG. 1, a composite color signal F is fed to an analog-to-digital converter ad for digitization. The digitization clock is a first clock signal t1, which comes from a variable-frequency first oscillator o1. Its frequency is, for example, four times the color-subcarrier frequency, which can be derived from the color-carrier loop in a simple manner. In FIG. 1, this is indicated by the fact that the control input of the first oscillator o1 is connected via a first low-pass filter tp1 to a color decoder cd. The digitization clock t1 may also be an asynchronous clock of fixed frequency.

The outputs of the color decoder cd are the two color signals U, V and the luminance signal Y, which are applied to the data inputs of an orthogonal filter rf consisting of a skew filter sf and an adjustable delay device g.

To determine the respective phase of the composite color signal F, the output of the analog-to-digital converter ad is coupled to the input of a first phase-locked loop PLL 1. A horizontal-synchronizing-pulse-separating stage ss extracts the horizontal synchronizing pulse and applies it to one input of a first phase comparator p1 whose other input is supplied with the output signal from a variable-frequency second oscillator o2. The control input of this oscillator o2 is connected via a second low-pass filter tp2 to the output of the first phase comparator p1, whereby the first phase-locked loop PLL 1 is completed.

For the operation of this phase-locked loop PLL 1, it is irrelevant whether it is of purely digital or mixed digital/analog design. However, it is necessary for the filtered phase comparator values to be accessible as digital values outside the first phase-locked loop PLL 1, with the low-order bits 1 being applied as a skew value sk to the control input of the skew filter sf. The high-order bits m of the phase comparator signal are applied through a control device, e.g., a first address generator a1, to the control input of the adjustable delay device g. The multiple N of the sampling period T in the phase comparator signal is defined via the high-order bits m. The low-order bits 1, i.e., the skew value sk, specify in fractions the time delay of the reference tr with respect to the sampling pattern determined by the first clock signal t1, as shown, for example, in FIG. 2.

The control device a1 adjusts the delay of the adjustable delay device g via the multiple N of the sampling period. The delay device g may be, for example, a shift register controlled by the first clock signal t1 and having a number of stages at least equal to twice the number of the maximum period multiple N to be corrected. Depending on the period multiple N to be corrected, the data word to be written in is written in N shift-register stages earlier or later as counted from a reference address, so that a lagging or leading phase, respectively, will be compensated. In this manner, orthogonality of the data after the orthogonal filter rf is achieved.

The adjustable delay device g in the orthogonal filter rf is necessary only if the composite order signals F include phase jumps which are greater than the sampling period T. That is usually the case during video recorder operation. If it is ensured that the deviations are smaller than the sampling period T, the adjustable delay device g will not be necessary.

If no picture-signal processing is to be performed in the signal processor sp shown in FIG. 1, the output signals of the orthogonal filter rf will be applied directly to the data inputs of a dual-port read/write memory r. On the other hand, the output of the orthogonal filter rf is especially suited for use as a data interface for the signal processing in an arbitrary signal processor sp in which multidimensional filter algorithms are implemented, for example. This orthogonal data interface is also suitable for applying orthogonal data Y', U', V' from an additional video-signal source (not shown).

The decoupling and delay of the data depending on the first and second clock signals t1, t2 is effected in the dual-port read/write memory r, whose write clock and read clock are the first clock signal t1 and the second clock signal t2, respectively. This memory r may be implemented as a dual-port random-access memory whose write and read addresses are determined by a write-address register a2 and a read-address register a3, respectively. The start addresses of the write-address register a2 and the read-address register a3 are triggered, respectively, by the horizontal reference clock hr and by a flyback signal f1' derived from the flyback pulse f1.

The dual-port read/write memory r may also be implemented as a FIFO memory. In that case, the write-address generator a2 generates the write pointer, whose start address is synchronized with the horizontal reference clock hr. The read-address generator a3 generates the read pointer, whose start address is synchronized with the flyback signal f1'. The FIFO memory must be capable of storing at least as many picture data as are necessary to compensate for the maximum phase deviation. The address control becomes especially simple if an entire picture line, i.e., more than necessary, is stored.

The output of the dual-port read/write memory r drives a digital color matrix mx, whose output signals, after being reconverted in a digital-to-analog converter da, are available as analog R, G, B signals for picture generation. Both the digital color matrix mx and the digital-to-analog converter da are controlled by the second clock signal t2.

In the second phase-locked loop PLL 2, a second phase comparator p2, a third low-pass filter tp3, a third, locked oscillator o3, a frequency divider ft and an output pulse shaper i for the horizontal pulse H are connected in cascade. Because of the lower cutoff frequency of the third low-pass filter tp3, the frequency and phase control system is only weakly coupled to the preceding stage.

As is well known, the reference phase for the luminous spot on the screen is determined by the intersection of the flyback pulse and a voltage reference. The voltage reference is usually a voltage value lying in the supply range (e.g., 0 to 5 V) of the signal-processing circuits, e.g., 2.5 V. It is derived by means of a limiter b (FIG. 1) whose passband characteristic lies in this voltage range. The output of the limiter b is the square-wave flyback signal f1', one edge of which serves as a reference quantity for the location of the luminous spot on the screen, which reference quantity can be evaluated electronically.

The flyback signal f1' is applied to one input of the second phase comparator p2, whose other input is supplied with the horizontal reference clock hr. To lock the second phase-locked loop PLL 2 to the phase of the flyback pulse f1 and to the horizontal reference clock hr and, thus, to the composite color signal F at a very low frequency, the second phase comparator p2 is followed by the third low-pass filter tp3, which has a very low cutoff frequency of, for example, 0.01 Hz or less. The third, locked oscillator o3 thus follows only very low-frequency variations of the flyback pulse f1 and the composite color signal F. The second phase-locked loop PLL 2 thus runs largely autonomously and must only compensate for the low-frequency phase and frequency deviations of the horizontal output stage.

In order that the second clock signal t2 has the same frequency as the first clock signal t1, the second clock signal t2 is derived from the first clock signal t1 by a clock-phase shifter dt. Such a clock-phase shifter is described, for example, in EP-A-181 952. In such a device, the first clock signal enters a chain of delay stages whose overall delay is approximately equal to the period of the first clock signal t1. The taps of all delay stages are connected to associated locking stages which are locked by applying the flyback signal f1' to them. The locked conditions of the individual stages are thus dependent on the phase relationship between the first clock signal t1 and the flyback signal f1'. The stored phase value can be obtained from the locking stages as a thermometer code, whose "1" states specify the number of delay stages required. To delay the first clock signal t1, use is advantageously made of those delay stages which were also used to form the thermometer code.

Figure 2:
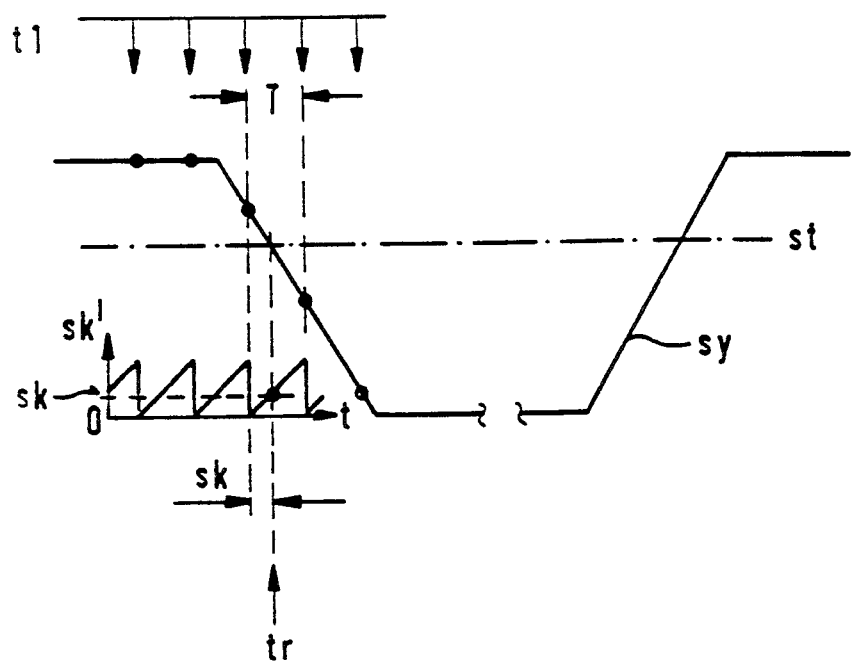
FIG. 2 schematically illustrates the determination of the skew value.

FIG. 2 shows schematically the determination of the skew value sk relative to a horizontal synchronizing pulse sy and a separation level st. At each sample value t1, the skew value sk' is zero. With increasing distance, it increases linearly up to the next sample value. The intersection of the separation level st and the horizontal synchronizing pulse sy defines the temporal/local reference value tr of the transmitted composite color signal F, to which all video data must be referred. The skew value sk is determined, for example, mathematically from the digitized sample values located before and after the point of intersection, or by averaging the entire synchronizing pulse or a separated zone.

Figure 3:
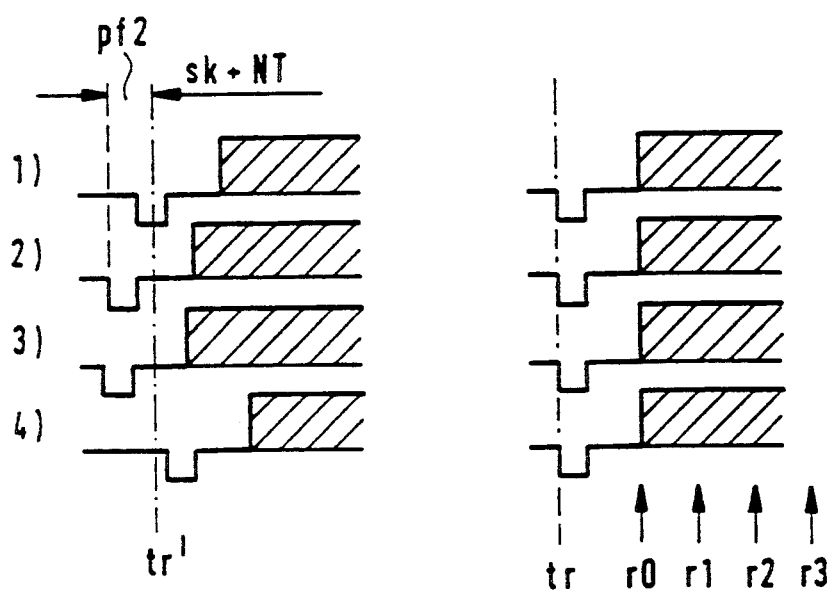
FIG. 3 schematically illustrates four lines of the composite color signal.

In the left-hand half of FIG. 3, four picture lines with horizontal synchronizing pulses and different phase errors are shown schematically one below the other. If all lines are shown without phase correction, the picture content will exhibit large horizontal variations from line to line. To compensate for the phase error, a mean time reference value tr', e.g., the horizontal reference clock hr in FIG. 1, is formed by means of the first phase-locked loop PLL 1. From this mean reference value tr', the respective phase error is determined, which is composed of the skew value sk and possibly an integral multiple N of the sampling period T. This phase error pf2 is shown for the second line.

As a result of the phase correction in the orthogonal filter rf, all subsequent lines are aligned orthogonally, and in the adjustable delay device g and in the subsequent memory devices, including the signal processor sp, all vertically aligned picture data are available for further signal processing in identical or vertically aligned memory registers r0 through r3. The different video lines are left justified, so to speak, as shown, for example, in the right-hand half of FIG. 3.

Figure 4:
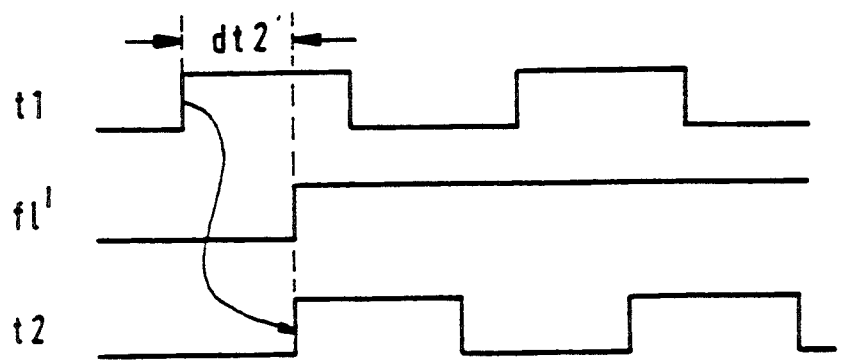
FIG. 4 illustrates the phase relationship between the first and second clock signals and the flyback signal.

FIG. 4 shows schematically the action of the clock-phase phase shifter dt, which controls the phase shift of the second clock signal t2 in accordance with the phase shift of the flyback signal f1' with respect to the first clock signal t1.

What is claimed is:

1. A digital television-signal-processing circuit that processes a composite color signal sampled by a first clock signal, said circuit comprising:
   a first phase-locked loop that receives said sampled composite color signal, said first phase-locked loop generating a horizontal reference clock and generating a filtered phase-difference value, said filtered phase-difference value comprising a plurality of low-order bits forming a skew value and a plurality of high-order bits forming an integral multiple N of the sampling period;
   a second phase-locked loop that receives said horizontal reference clock generated by the first phase-locked loop and that receives a flyback signal responsive to a flyback pulse, said second phase-locked loop comprising a frequency and phase control system having a locked oscillator, said second phase-locked loop generating a horizontal pulse having a phase responsive to the temporal position of the flyback signal;
   a color decoder that receives said sampled composite color signal and that generates luminance-signal values and color-signal values;
   an orthogonal filter comprising:
      a skew filter that receives said luminance-signal values and said color-signal values and that generates phase-corrected output values in response to said skew value;
      an adjustable delay device that selectively delays said phase-corrected output values; and
      a control device that receives said integral multiple N and that adjusts the delay of said adjustable delay device;
   a dual-port read/write memory having a write-address input and a read-address input, and having a write clock and a read clock, said write clock being said first clock signal, said dual-port read/write memory receiving and storing said phase-corrected output values;
   a write-address generator that provides write addresses to said write address input of said dual-port read/write memory, said write-address generator providing a start address in response to said horizontal reference clock;
   a read-address generator that provides read addresses to said read-address input of said dual-port read/write memory, said read-address generator providing a start address in response to said flyback signal; and
   a clock-phase shifter that receives said first clock signal and that generates a second clock signal that is provided to said read clock input of said dual-port read/write memory, said clock-phase shifter further receiving said flyback signal and synchronizing said second clock signal with said flyback pulse so that data stored in said dual-port read/write memory is read out in synchronism with said flyback pulse.

2. A circuit as defined in claim 1, wherein said dual-port read/write memory is implemented with a random-access solid-state memory device, the write function and the read function being separated from each other by a dual-port control.

3. A circuit as defined in claim 1, wherein said adjustable delay device is implemented with a random-access solid-state memory device, the write function and the read function being separated from each other by a dual-port control.

4. A circuit as defined in claim 1, wherein:
   said adjustable delay device comprises a shift register controlled by said first clock signal, said shift register having a number of stages, said number being at least equal to twice the maximum number of multiples N of the sampling period of the jittered composite color signal to be corrected; and said control device for said adjustable delay device comprises a first address generator which, depending on the positive or negative period multiple N to be corrected, causes the data word to be written in N shift-register stages earlier or later, respectively, as counted from a reference address.

5. A circuit as defined in claim 1, characterized in that the dual-port read/write memory is a first-in first-out (FIFO) memory which stores the data for at least the time of the phase deviations to be compensated.

6. A circuit as defined in claim 1, wherein:
said dual-port read/write memory is a FIFO memory which stores the data of one television line;
said write-address generator serves as a write pointer whose start address is synchronized with the horizontal reference clock; and
said read-address generator serves as a read pointer whose start address is synchronized with the flyback signal.

7. A circuit as defined in claim 1, characterized in that the output of said orthogonal filter serves as an orthogonal data interface.

8. A circuit as defined in claim 7, further comprising a signal processor for processing orthogonal luminance and color signals from at least one video-signal source is interposed between the orthogonal filter and the dual-port read/write memory.

9. A circuit as claimed in claim 1, wherein said first phase-locked loop comprises a digital variable-frequency oscillator having a timing device that is a periodically overflowing accumulator.

10. A circuit as defined in claim 1, wherein said locked oscillator in said second phase-locked loop comprises a digital oscillator having a timing device that is a periodically overflowing accumulator.

11. A digital television-signal-processing circuit that processes a composite color signal sampled by a first clock signal, said composite color signal having a maximum phase-jitter value less than one sampling period, said circuit comprising:
a first phase-locked loop that receives said sampled composite color signal, said first phase-locked loop generating a horizontal reference clock and generating a filtered phase-difference value, said filtered phase-difference value comprising a plurality of low-order bits forming a skew value and a plurality of high-order bits forming an integral multiple N of the sampling period;
a second phase-locked loop that receives said horizontal reference clock generated by the first phase-locked loop and that receives a flyback signal responsive to a flyback pulse, said second phase-locked loop comprising a frequency and phase control system having a locked oscillator, said second phase-locked loop generating a horizontal pulse having a phase responsive to the temporal position of the flyback signal;
a color decoder that receives said sampled composite color signal and that generates luminance-signal values and color-signal values;
an orthogonal filter comprising a skew filter that receives said luminance-signal values and said color-signal values and that generates phase-corrected output values in response to said skew value;
a dual-port read/write memory having a write-address input and a read-address input, and having a write clock and a read clock, said write clock being said first clock signal, said dual-port read/write memory receiving and storing said phase-corrected output values;
a write-address generator that provides write addresses to said write address input of said dual-port read/write memory, said write-address generator providing a start address in response to said horizontal reference clock;
a read-address generator that provides read addresses to said read-address input of said dual-port read/write memory, said read-address generator providing a start address in response to said flyback signal; and
a clock-phase shifter that receives said first clock signal and that generates a second clock signal that is provided to said read clock input of said dual-port read/write memory, said clock-phase shifter further receiving said flyback signal and synchronizing said second clock signal with said flyback pulse so that data stored in said dual-port read/write memory is read out in synchronism with said flyback pulse.

12. A digital television-signal-processing circuit for digitizing by means of a sampling clock, a composite color signal comprising a luminance and at least one component color signal, said sampling clock being a first clock signal and having a sampling period, said circuit comprising:
a first phase-locked loop that provides a filtered phase-difference value at a first output, said value being split into lower-order bits forming a skew value and higher-order bits forming an integral multiple N of said sampling period, said first phase-locked loop further providing a horizontal reference clock at a second output;
a second phase-locked loop having a first input coupled to said second output of said first phase-locked loop and a second input that receives a flyback signal, said first phase-locked loop and said second phase-locked loop operating in combination to provide a horizontal pulse having a certain phase, said second phase-locked loop comprising a frequency and phase control system having a locked oscillator, said frequency and phase control system being loosely coupled to said horizontal reference clock to correct said horizontal pulse phase depending upon the temporal position of said flyback signal;
an orthogonal filter that receives an unadjusted video signal at a first input, said orthogonal filter comprising:
a skew filter coupled to said first output of said first phase-locked loop to provide purely delay-related phase correction; and
an adjustable delay device that corrects large phase differences;
a control device coupled at an input to said first output of said first phase-locked loop and coupled at an output to an input of said adjustable delay device, said control device adjusting said delay device in dependence on said multiple N;
a write address generator coupled at an input to said second output of said first phase-locked loop, said write address generator providing a sequence of write addresses at an output beginning with a start write address;

a read address generator having an input that receives said flyback signal, said read address generator providing a sequence of read addresses at an output beginning with a start read address;

a dual-port read/write memory coupled at a first input to an output of said orthogonal filter for receiving data therefrom, further coupled at a second input to the output of said write address generator, and coupled at a third input to the output of said read address generator, said memory having a plurality of write addresses and having a plurality of read addresses, the writing to said write addresses beginning with said start write address being triggered by said horizontal reference clock via said write address generator, and the reading of said start read address beginning with said start read address being triggered by said flyback signal via said read address generator; and a clock phase shifter having a first input that receives said flyback signal and a second input that receives said first clock signal, said clock phase shifter deriving a second clock signal from said first clock signal and providing said second clock signal to a fourth input of said dual-port read/write memory, said second clock signal serving as a read clock for said memory.

* * * * *